Figure 1:
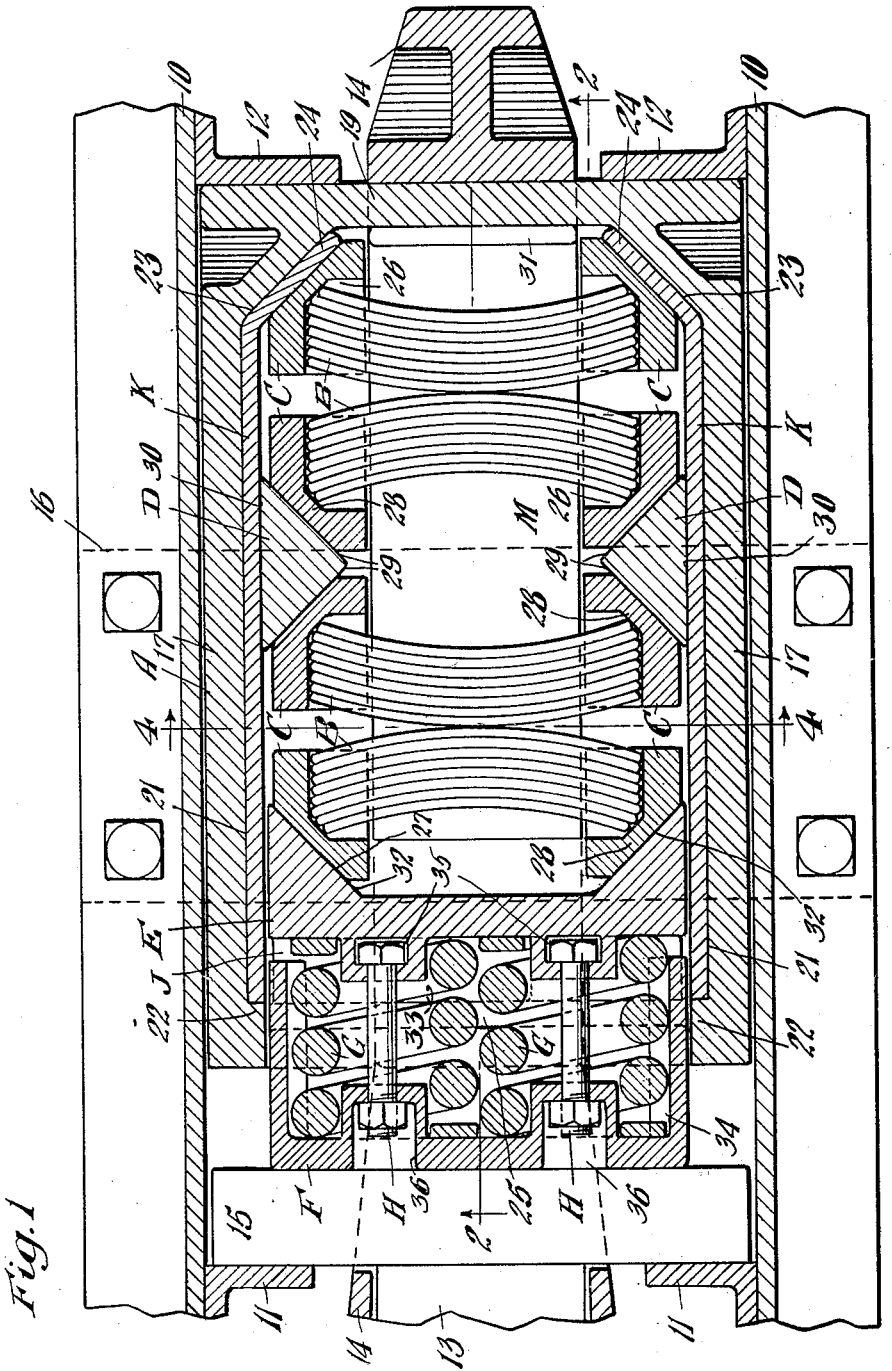

June 7, 1932. J. F. O'CONNOR 1,861,664
FRICTION SHOCK ABSORBING MECHANISM
Original Filed Oct. 7, 1929 2 Sheets-Sheet 1

Witness
Wm. Geiger

Inventor
John F. O'Connor
By Joseph Harris
his Atty.

June 7, 1932.  J. F. O'CONNOR  1,861,664
FRICTION SHOCK ABSORBING MECHANISM
Original Filed Oct. 7, 1929   2 Sheets-Sheet 2
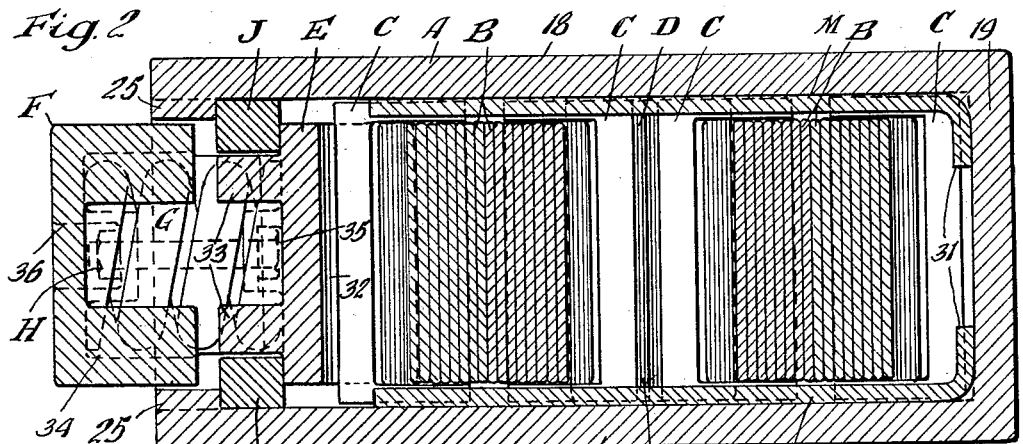
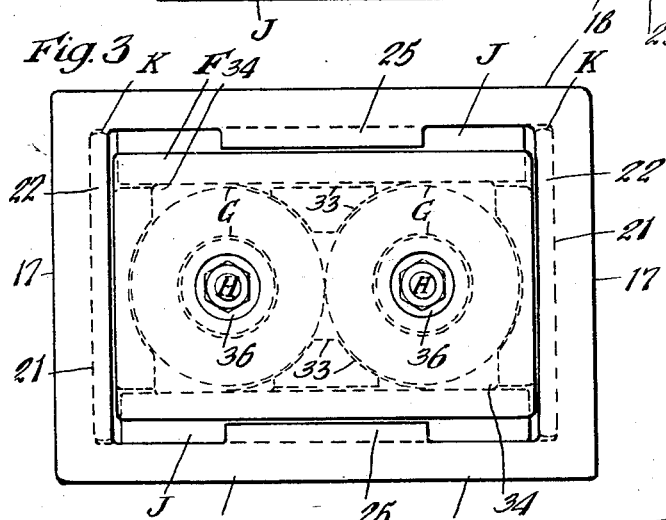
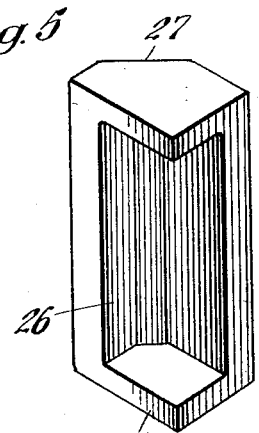
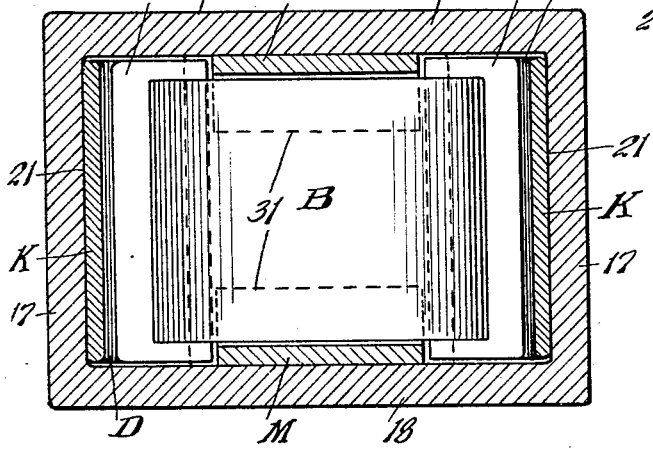
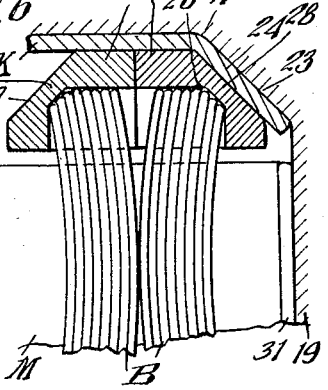
Witness
Wm. Geiger
Inventor
John F. O'Connor
By Joseph Harris
his Atty.

Patented June 7, 1932

1,861,664

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed October 7, 1929, Serial No. 397,846. Renewed November 6, 1931.

This invention relates to improvements in friction shock absorbing mechanisms.

One object of the invention is to provide a friction shock absorbing mechanism for railway draft riggings, having high capacity produced by a plurality of co-acting wedge and friction elements, wherein easy and certain release of the parts is assured.

Another object of the invention is to provide a friction shock absorbing mechanism of the character indicated in the preceding paragraph having light preliminary action combined with heavy resistance during the last part of the compression stroke, together with easy and certain release of the parts.

A further object of the invention is to provide a friction shock absorbing mechanism including a friction casing and a follower member relatively movable toward each other, and spring resisted friction wedge means cooperating with the casing comprising a plurality of laminated plate springs and cooperating friction wedge members actuated through compression of the plate springs, the plates forming the springs being normally bowed and flexed to straighten the same when placed under compression forces, whereby certain of the friction wedge members are forced apart laterally, thereby sliding the same on the cooperating friction wedge members, the latter being forced to slide on the casing walls during the compression of the mechanism, thereby augmenting the resistance.

A still further object of the invention is to provide a friction shock absorbing mechanism specially adapted for draft riggings of passenger cars, including a friction casing; a main follower; a spring resistance means including a plurality of sets of bowed plate spring members disposed within the casing transversely thereof; a plurality of spring follower members in the form of wedge blocks cooperating with the plate springs; and a plurality of friction wedge blocks cooperating with the first named wedge blocks and having sliding frictional engagement with the casing, wherein the follower and casing are movable toward each other during compression of the mechanism, thereby flexing the spring plates to straighten the same and spread the wedge acting spring follower members laterally apart, thereby forcing the same to slip on the wedge faces of the cooperating friction wedge blocks, the latter sliding on the friction surfaces of the casing due to the contraction of the spring resistance means lengthwise of the mechanism.

Another object of the invention is to provide a friction shock absorbing mechanism including a friction casing and a follower member, relatively movable toward each other, spring resisted friction wedge means cooperating with the casing, comprising a plurality of laminated plate springs and friction wedge members actuated through compression of the plate springs, wherein the friction wedge members have sliding movement on each other and on the casing walls to produce high capacity, and wherein light preliminary action is had, produced by cushioning means interposed between the follower and the spring resisted friction wedge means.

A more specific object of the invention is to provide a friction shock absorbing mechanism including a casing having interior, longitudinally disposed friction surfaces; a main follower movable toward and away from the casing; friction wedge blocks having sliding engagement with the friction surfaces of the casing; a plurality of pairs of laminated plate springs arranged transversely of the mechanism, each pair including two sets of curved spring plates with the convex surfaces of the two sets in engagement, whereby pressure applied to the plate springs lengthwise of the mechanism effects flexing of the plates to straighten or flatten the same, thus causing elongation of the laminated plate springs transversely of the mechanism; and wedge blocks cooperating with each laminated plate spring and having wedging engagement with the friction wedge blocks, the wedge blocks being forced laterally outwardly through the flexing action of the laminated plate springs, thereby effecting slippage thereof on the friction wedge blocks, additional frictional resistance being had by sliding movement of the friction wedge blocks on the casing wall due to contraction of the laminated plate spring resistance means lengthwise of the mechanism.

Other objects of the invention will more clearly appear from the description and claims hereinafter following.

In the drawings, forming a part of this specification, Figure 1 is a horizontal, sectional view through the underframe structure of a railway car, illustrating my improvements in connection therewith. Figure 2 is a vertical, longitudinal sectional view, corresponding substantially to the line 2—2 of Figure 1. Figure 3 is a front end elevational view of the shock absorbing mechanism proper, illustrated in Figures 1 and 2. Figure 4 is a vertical, transverse sectional view, corresponding substantially to the line 4—4 of Figure 1. Figure 5 is a detailed, perspective view of a combined spring cap and wedge member employed in connection with my improved mechanism. And Figure 6 is a horizontal sectional view, partly broken away, through the rear end portion of the friction casing, showing the position assumed by these parts when the mechanism is fully compressed.

In said drawings, 10—10 indicate channel-shaped center or draft sills of a railway car underframe, to the inner sides of which are secured front stop lugs 11—11 and rear stop lugs 12—12. The inner end portion of the coupler shank is indicated by 13 and a yoke 14 of well known form, is operatively connected thereto. My improved shock absorbing mechanism and the front main follower 15 are disposed within the yoke, and the yoke in turn, is operatively supported by a detachable saddle plate 16 secured to the bottom flanges of the sills 10.

My improved shock absorbing mechanism comprises broadly: A casing A; two pairs of laminated plate springs B—B and B—B; a plurality of combined spring cap and wedge members C—C; a pair of wedge friction blocks or shoes D—D; a combined spring follower and wedge member E; an outer spring follower F; a preliminary spring resistance G; two retainer bolts H—H; two retainer keys J—J; a pair of friction liners K—K; and a pair of wear-plates M—M.

The casing A is in the form of a substantially rectangular box-like member having longitudinally disposed spaced side walls 17—17, spaced longitudinally extending, top and bottom walls 18—18, and a transverse vertical rear end wall 19. The end wall 19 cooperates with the stop lugs 12 in the manner of the usual rear follower. The side walls of the casing A are provided with interior liners K—K which extend lengthwise of the same and are seated in pockets 21—21 formed inwardly of the open end of the casing. The front end walls 22—22 of the pockets provide vertical shoulders against which the front end portions of the liners bear. As clearly shown in Figure 1, the side walls 17 are thickened at the rear end of the casing, the inner surfaces of the same being inclined, as shown, thereby providing, opposed, rearwardly converging abutment surfaces 23. The liners C have the inner end portions thereof inturned as indicated at 24—24 to fit the abutment surfaces 23—23. As will be evident the inclined inner surfaces of the portions 24—24 present wedge faces. At the forward end of the casing A the top and bottom walls are provided with inwardly projecting enlargements 25—25 which provide transverse, outer stop-shoulders, for a purpose hereinafter pointed out. As shown in Figure 3, the enlargements 25 are centrally disposed between the opposite side walls of the casing, thus providing a space at each side of the casing to permit insertion of the spring caps, wedge blocks and combined spring followers and wedge member, as hereinafter pointed out.

The laminated plate springs B—B comprise two pairs, arranged transversely of the casing at the front and rear end thereof. Each plate spring B comprises a plurality of rectangular plates, which are transversely curved and arranged in nested relation. As shown, each laminated plate spring comprises eight such plates. The plates of each pair of laminated springs B—B are reversely arranged, that is, the convex faces or surfaces are opposed and said surfaces of the outermost plates are in bearing contact.

The combined spring caps and wedge members C—C are arranged in pairs, at opposite ends of the laminated plate springs B, one pair of combined caps and wedge members C—C being associated with each spring. The members C are of similar design, each being in the form of a hollow block having an interior pocket 26 in which the outer ends of the plates of the springs B are seated. Each member C is provided with a wedge face 27 on the outer side thereof. The interior pockets 26 of the members C provide longitudinally extending abutment walls against which the outer ends of the plates bear, and a transverse end wall overhanging the corresponding end portions of the spring. As most clearly shown in Figure 1, the longitudinal and transverse walls of each member C are connected by an inclined wall section 28. The innermost plate of each set is preferably made shorter than the remaining plates so that it will be accommodated between the inclined walls of the corresponding pair of members C—C. The wedge faces 27—27 of the pair of members C which cooperate with the rearmost laminated plate spring B have wedging engagement with the wedge sections 24 of the liners K—K. The spring caps C—C of the innermost laminated plate springs of the front and rear pairs have wedging engagement with the two wedge blocks D—D. The wedge blocks D have front and rear wedge faces 29—29 which cooperate with the corresponding wedge faces 27—27 of the caps C at the same side of the mechanism. Each block D is provided with a longitudinally disposed outer friction surface 30 which cooperates with the longitudinal friction surface of the liner K at the same side of the casing. The outermost laminated plate spring of the front pair has the spring caps C thereof cooperating with the combined spring follower and wedge member E. In order to protect the top and bottom walls of the casing from damage by the raw edges of the plates of the springs B, the wear plates M—M are provided. As shown, these plates are of substantially rectangular form and have vertical flanges 31—31 at the inner ends thereof which abut the end wall 19 of the casing. The plates M are of such a width as to fill the space between the pairs of combined spring caps and wedge members when the latter are in their innermost position, in full release of the mechanism, as shown in Figure 1. The front ends of the plates M are spaced an appreciable distance inwardly of the transverse shoulders of the enlargements 25—25 of the casing A.

The combined spring follower and wedge member E is in the form of a relatively heavy rectangular plate having inwardly diverging opposed, interior wedge faces 32—32 which cooperate with the wedge faces 27—27 of the outer pair of combined spring caps and wedge members C—C. The combined spring follower and wedge member E is held assembled with the casing A and limited in its outward movement by the retaining keys J—J. As most clearly shown in Figure 2, the retaining keys J—J are disposed at the top and bottom of the casing between the transverse stop shoulders of the enlargements 25—25 and the forward side of the spring follower E. In order to prevent displacement of the retaining keys J the spring follower is provided with forwardly projecting top and bottom ribs 33—33 which slidingly engage the corresponding retaining keys. As shown in Figure 2 the spring follower plate E is of lesser height than the distance between the top and bottom walls of the casing, so that the same will have free movement between the wear plates M—M.

The outer spring follower F is in the form of a rectangular block having interior pockets 34—34 in which the springs G—G are accommodated. The follower F is of such a size as to telescope within the front end of the casing A and normally projects outwardly of the casing and has bearing engagement with the main follower 15. The two spring resistance members G, which are in the form of coil members, are interposed between the front end walls of the pockets 34 of the spring follower F and the outer side of the combined spring follower and wedge member E. The outer spring follower F is anchored to the combined spring follower and wedge member E by the retainer bolts H—H which have the heads thereof disposed in the pockets 35—35 provided on enlargements on the follower E, and have the nut members thereof slidingly disposed in hollow bosses 36—36 provided on the outer spring follower F. The coils of the springs G are held centered by the enlargements or bosses on the outer spring follower and combined spring follower and wedge member, the bosses extending into the coils of the spring.

In assembling the parts of the mechanism, the liners K—K and the wear plates M—M, together with the laminated plate springs B—B, the combined spring caps and wedge members C—C, the wedge friction blocks D—D and the combined spring follower and wedge member E are first placed within the casing, the retainer bolts H—H being attached to the follower E. The follower E is then forced inwardly and the keys J are inserted between the same and the shoulders at the front end of the casing. The parts are then permitted to expand until the follower E assumes the position shown in Figures 1 and 2, wherein the same is in engagement with the keys J which in turn engage the transverse shoulders of the enlargements 25. The two springs G assembled with the outer spring follower F are next applied, the follower F being telescoped within the front end of the casing A. The follower F is then connected to the follower E by the retainer bolts H—H.

In the normal full release position of the parts, as shown in Figures 1 and 2, the follower F is spaced slightly from the follower E so as to provide for preliminary compression of the springs G. The keys J—J are also spaced from the front ends of the wear plates M so as to allow a certain amount of inward movement of said keys.

The operation of my improved shock absorbing mechanism, is substantially the same in both buff and draft, the main follower 15 and the casing A being moved inwardly toward each other. As will be clear, during a buffing action, the follower 15 is moved rearwardly while the casing A is held stationary by the stop lugs 12, and during a draft action the casing A will be pulled forwardly by the yoke 14 while the main follower 15 is held stationary by the front stop lugs 11—11. During compression of the mechanism in either buff or draft, the spring follower F will be forced inwardly of the casing thereby compressing the springs G—G against the combined spring follower and wedge member E during the first part of the compression stroke. During this action the laminated plate springs oppose inward movement of the spring follower E. The capacity of the laminated plate springs, together with the frictional resistance offered by the friction wedge members is such as to greatly exceed the capacity of the springs G, thus assuring compression of the springs G during the early part of the operation to provide for preliminary light resistance. Relative movement of the spring followers F and E is finally limited by engagement of the same with each other, whereupon the combined spring follower and wedge member E will be forced inwardly of the casing A in unison with the main follower 15. As the follower E is moved inwardly, the laminated plate springs B will be compressed thus causing flexing thereof to flatten out the same. As will be evident, the spring members B are thus elongated or explained laterally of the casing causing the corresponding pairs of spring caps to be forced laterally apart. The spring caps will thus slide on the wedge faces of the follower E, the blocks D and the sections 24 of the liners K. Due to the longitudinal compression of the laminated plate spring members B there will also be a sliding rearward movement of the blocks D on the friction surfaces of the liners K. When the mechanism is fully compressed relative movement of the follower 15 and the casing A will be arrested by engagement of these parts. At this time the spring caps C—C will assume the position shown in Figure 6, that is, the caps of each pair of laminated plate springs B will abut each other.

In release of the mechanism, when the actuating force is reduced, tendency of the laminated plate spring members to assume their normal curved or bowed condition will affect restoration of the spring follower caps C—C, the friction shoes D—D and also the combined spring follower and wedge member E. Outward movement of the member E being limited by the retainer keys J—J. Expansion of the spring resistance elements G—G will affect restoration of the spring follower F to the full release position, movement of the same being limited by the retainer bolts H—H. Release of the mechanism is facilitated by the relatively blunt angularity of the cooperating wedge faces, the various wedge members being thus free to drop away from each other immediately upon the actuating force being reduced.

As will be evident, my improved friction shock absorbing mechanism provides relatively light preliminary action by the compression of the springs G, followed by heavy resistance produced by compression of the laminated plate springs B and the friction created between the members C, the follower E, the blocks D and the wedge sections 24 of the liners, and between the blocks D and the friction surfaces of the liners. The preliminary light action particularly adapts my improved shock absorbing mechanism for use in connection with passenger equipment.

I have herein shown and described what I consider the preferred manner of carrying out my invention, but the same is merely illustrative and I contemplate all changes and modifications that come within the scope of the claims appended hereto.

I claim:

1. In a friction shock absorbing mechanism, the combination with a casing; of combined cushioning and friction means in the casing including a movable follower element; a second follower element adapted to receive the actuating force; a spring interposed between said first and second named follower elements; means for anchoring said follower elements to each other to limit relative separation thereof; and removable retaining elements having shouldered engagement with the casing and said second named follower element for connecting the latter to the casing and limiting outward movement thereof.

2. In a friction shock absorbing mechanism, the the combination with front and rear followers relatively movable toward and away from each other in a direction lengthwise of the mechanism; of a spring follower element; preliminary spring resistance means interposed between the front follower and said spring follower element; spring means interposed between said spring follower element and the rear follower and adapted to be compressed during relative approach of said last named followers, said last named spring means being expansible laterally of the mechanism upon being compressed lengthwise of the same; and friction means including relatively movable friction members, certain of which are forced apart laterally by lateral expansion of the spring resistance means and forced to slide on the remaining members.

3. In a friction shock absorbing mechanism, the combination with a casing having opposed interior friction surfaces; of friction shoes at opposite sides of the casing movable lengthwise of said friction surfaces; wedge blocks at opposite sides of the casing having wedging engagement with the shoes; traversely disposed bowed spring plates within the casing interposed between the wedge blocks at opposite sides of the mechanism; a spring follower member, said member and casing being relatively movable lengthwise of the mechanism, said spring follower member cooperating with the plates to compress the same lengthwise of the mechanism, thereby effecting flattening thereof; a main follower movable toward and away from the casing; and a preliminary spring resistance interposed between the main follower and spring follower.

4. In a friction shock absorbing mechanism, the combination with a casing having interior liners on the side walls thereof presenting opposed friction surfaces; of a plurality of transversely disposed laminated plate springs within the casing, the plates of each spring being bowed and the convex outer surface of each plate spring engaging the outer convex surface of the next adjacent plate spring; a pair of wedge blocks cooperating with each laminated plate spring, each laminated plate spring having the opposite ends thereof engaging said blocks; friction shoes slidable lengthwise on the friction surfaces of the liners and having wedging engagement with the wedge blocks; and spring follower means cooperating with said laminated plate springs to flex the same to effect lateral elongation thereof to spread said wedge blocks apart.

5. In a friction shock absorbing mechannism, the combination with a casing having opposed interior friction surfaces; of a spring follower, said follower and casing being movable relatively lengthwise of the mechanism, said spring follower carrying means providing laterally, inwardly acting wedge faces, and said casing also carrying means presenting laterally inwardly acting wedge faces; friction shoes disposed on opposite sides of the mechanism and cooperating with the friction surfaces of the casing, said shoes presenting laterally, inwardly acting wedge faces; laminated plate springs arranged in pairs, said pairs of springs being in abutment, the plates of each spring being curved and disposed transversely of the mechanism; a pair of spring follower caps cooperating with each laminated plate spring and arranged on opposite sides of the mechanism, said spring follower caps having longitudinal abutment faces engaging the opposite ends of the spring plates and each spring follower having wedging engagement with one of said wedge faces; a main follower, said main follower and casing being movable toward and away from each other; and a preliminary spring resistance interposed between the main follower and the spring follower.

In witness that I claim the foregoing I have hereunto subscribed my name this 5th day of October, 1929.

JOHN F. O'CONNOR.